(12) United States Patent
Taira et al.

(10) Patent No.: US 7,093,983 B2
(45) Date of Patent: Aug. 22, 2006

(54) OPTICAL CONNECTOR PLUG AND OPTICAL CONNECTOR

(75) Inventors: Junji Taira, Chiba (JP); Norimasa Arai, Chiba (JP); Kouji Minami, Chiba (JP)

(73) Assignee: Seikoh Giken Co., Ltd., (JP)

( * ) Notice: Subject to any disclaimer, the term of this patent is extended or adjusted under 35 U.S.C. 154(b) by 33 days.

(21) Appl. No.: 11/004,781

(22) Filed: Dec. 3, 2004

(65) Prior Publication Data
US 2005/0196106 A1    Sep. 8, 2005

(30) Foreign Application Priority Data
Dec. 5, 2003   (JP)   .............................. 2003-406852
Nov. 29, 2004  (JP)   .............................. 2004-344531

(51) Int. Cl.
   G02B 6/36    (2006.01)
(52) U.S. Cl. ............................. 385/78; 385/60; 385/92; 385/139
(58) Field of Classification Search ................. 385/60, 385/78, 92, 139
See application file for complete search history.

(56) References Cited
U.S. PATENT DOCUMENTS
6,685,362 B1 * 2/2004 Burkholder et al. .......... 385/78

2004/0223701 A1 * 11/2004 Tanaka et al. ................. 385/55

* cited by examiner

*Primary Examiner*—Michelle Connelly-Cushwa
*Assistant Examiner*—James D. Stein
(74) *Attorney, Agent, or Firm*—Adams & Wilks (57) ABSTRACT

Provided are an optical connector plug and an optical connector, including: a shielding plate which is held in a plug frame holding hole of a plug housing in a manner that allows the shielding plate to tilt, the distal end of the shielding plate moving between a shielding position and an unshielding position; an operating plate which is held in a tiltable manner in the plug frame holding hole and adapted to tilt along with the shielding plate, the plug frame being capable of retracting, upon movement of the shielding plate to the shielding position, to a housing position at which no interference occurs with the shielding plate and the operating plate; and a biasing and holding member for biasing and positioning the shielding plate and the operating plate in a manner that brings the shielding plate to the shielding position as the plug frame moves to the housing position. When the plug frame is moved toward a front end of the plug housing, the operating plate is tilted by this movement of the plug frame, and the tilted operating plate pushes the shielding plate to the unshielding position, thus allowing the plug frame to move to an optical connection position with respect to the plug housing.

13 Claims, 9 Drawing Sheets

OPTICAL CONNECTOR PLUG AND OPTICAL CONNECTOR

BACKGROUND OF THE INVENTION

1. Field of the Invention

The present invention relates to an optical connector plug and an optical connector for holding a front end of an optical fiber and optically connecting the optical fibers.

2. Description of the Related Art

Conventionally, optical connection of optical fibers used in optical communication or the like is carried out by a method of using an optical connector having an optical connector plug holding a front end of the optical fiber and an optical connector adapter for carrying out optical connection of the optical fibers by fixing the optical connector plugs, or a method of fusion-welding front end faces of the optical fibers.

According to the optical connection of the optical fibers by fusion-welding, there arises a problem that attachment and detachment of the optical connection of the optical fibers cannot be carried out. There also arises a problem that fusion-welding steps are complicated which gives rise to a problem that there is a restriction in use thereof.

Therefore, by using an SC type optical connector using a cylindrical member for a ferrule which holds an optical fiber and has an outer diameter of 2.5 mm, or a comparatively downsized MU type optical connector using a cylindrical member for a ferrule which holds an optical fiber and has an outer diameter of 1.25 mm, or the like, the optical fiber fusion-welding steps are unnecessary, and attachment and detachment of the optical connection of the optical fibers is easily carried out.

Optical fibers have lately been applied to access networks that connect subscribers' lines to telephone switching stations. This is called Fiber To The Home (FTTH) and can build a high-speed communication environment. Optical fiber communications use in general infrared rays having a wavelength of 1.3 to 1.55 µm, but a steady increase in output power is being observed.

A protective cover has been proposed to protect the front end face of an optical fiber from contaminants such as dust, finger prints, and water spots (see JP07-281055 A and JP2002-156557 A, for example) The cover is placed along the outer circumference of an optical connector plug that holds the optical fiber, and is operated to cover the front end face of the optical connector plug.

A problem of any SC type, MU type, or like other conventional optical connector plug is that light is radiated from the front end face of an optical fiber it holds since the light could be hazardous to human health if radiated for a certain period of time onto human body, especially a localized area such as an eye.

While a particularly high level of safety is required of an optical connector plug that holds the tip of an optical fiber that is led inside a house by FTTH or the like, common SC type, MU type, or other optical connector plugs currently used in FTTH have no preventive measures against light radiation and accordingly contain a hazard to health.

The risk of harming human body with light irradiated from the tip of an optical fiber is increasing with the increase in output power of optical communications.

The cover provided to protect the front end face of an optical fiber in the optical connector plug that is disclosed in JP 07-281055 A and JP 2002-156557 A mentioned above can also block light radiated from the tip of the optical fiber. However, a drawback of the optical connector plug having a cover is that the cover, which is placed and operated on an outer wall of the optical connector plug, gives the optical connector plug contours different from those of conventional optical connector plugs. The unusually shaped optical connector plug makes it necessary for an optical connector adapter, which connects two optical connector plugs with each other face-to-face, to have a shape different from its conventional shape in conformity with the unique shape of the optical connector plug, thereby raising the manufacture cost.

The optical connector plug having a cover also requires a new specification separate from the existing one for SC type, MU type, and other conventional optical connector plugs, meaning that it is incompatible with SC type, MU type, and other conventional optical connector plugs. In order to apply the optical connector plug having a cover and the new specification to existing equipment where an SC type or MU type optical connector plug has been employed, every component of the equipment has to be replaced with new one at high cost.

SUMMARY OF THE INVENTION

The present invention has been made in view of the above, and an object of the present invention is therefore to provide an optical connector plug and an optical connector which are enhanced in safety by blocking, readily and without fail, light radiated from an optical fiber and which are reduced in manufacture cost and introduction cost.

To attain the above object, according to a first aspect of the present invention, there is provided an optical connector plug including: a plug frame for holding a ferrule in which an optical fiber is held; a plug housing having a plug frame holding hole in which the plug frame is held in a manner that allows the plug frame to move axially, the plug frame holding hole piercing through the entire length of the plug housing; a shielding plate whose proximal end is held to one side of an inner surface of the plug frame holding hole of the plug housing in a manner that allows the shielding plate to tilt, and whose distal end moves between a shielding position, at which the shielding plate shields a front end face of the ferrule, and an unshielding position, at which the shielding plate allows the plug frame to move; an operating plate whose proximal end is held, in a tiltable manner, to the one side of the inner surface of the plug frame holding hole at a position nearer to the center of the optical connector plug than the shielding plate, and whose distal end is in contact with or is engaged with the shielding plate to tilt along with the shielding plate, the plug frame being capable of retracting, upon movement of the shielding plate to the shielding position, to a housing position at which no interference occurs with the shielding plate and the operating plate; and biasing and holding means for biasing and positioning the shielding plate and the operating plate in a manner that brings the shielding plate to the shielding position as the plug frame moves to the housing position, the optical connector being characterized in that when the plug frame is moved toward a front end of the plug housing, the operating plate is tilted by this movement of the plug frame, and the tilted operating plate pushes the shielding plate to the unshielding position, allowing the plug frame to move to an optical connection position with respect to the plug housing.

DETAILED DESCRIPTION OF THE PREFERRED EMBODIMENTS

A detailed description on the present invention is given below through embodiments.

First Embodiment

Figure 1:
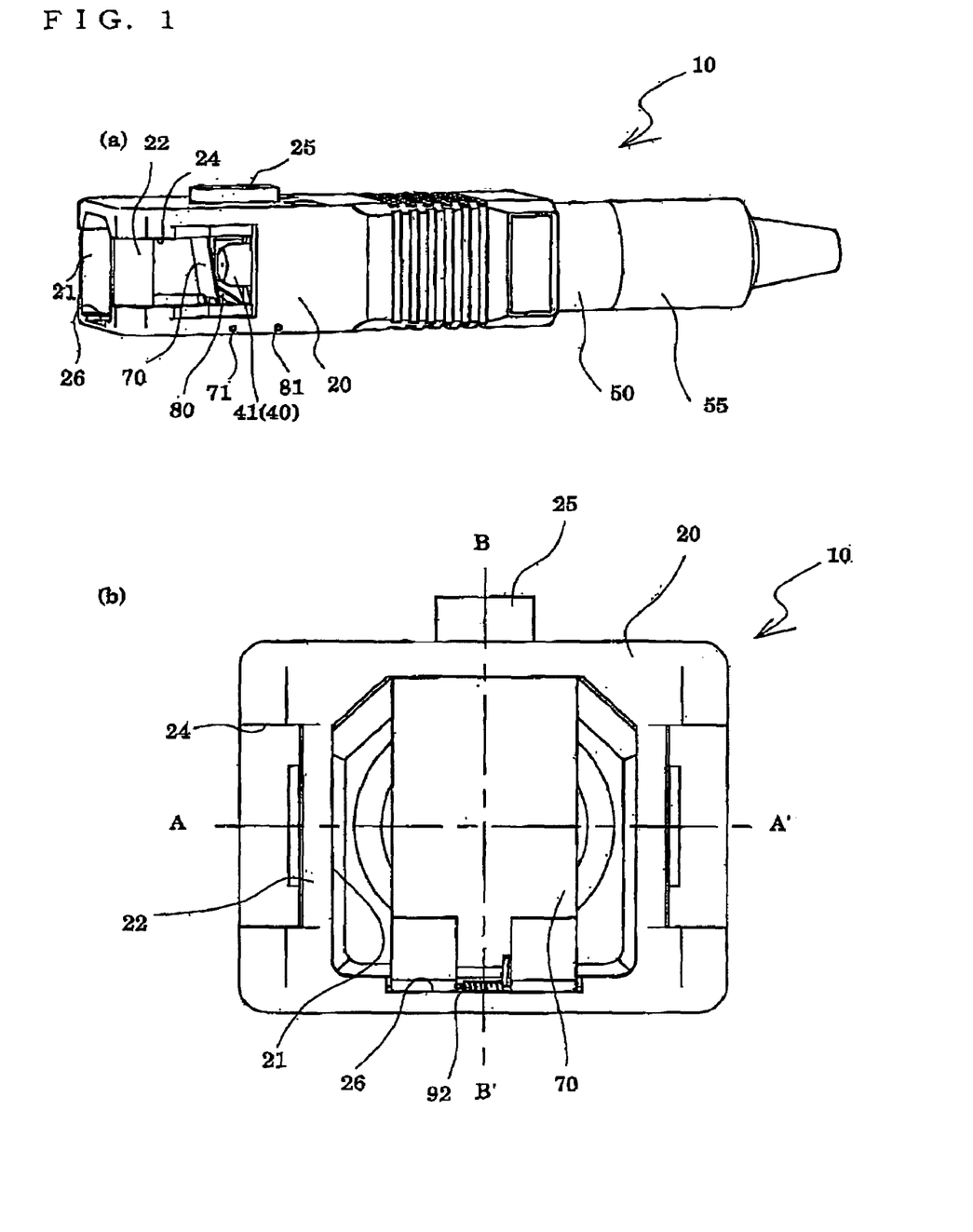
FIGS. 1A and 1B are a perspective view of an optical connector plug according to a first embodiment of the present invention and a plan view of the same, respectively.
Figure 2:
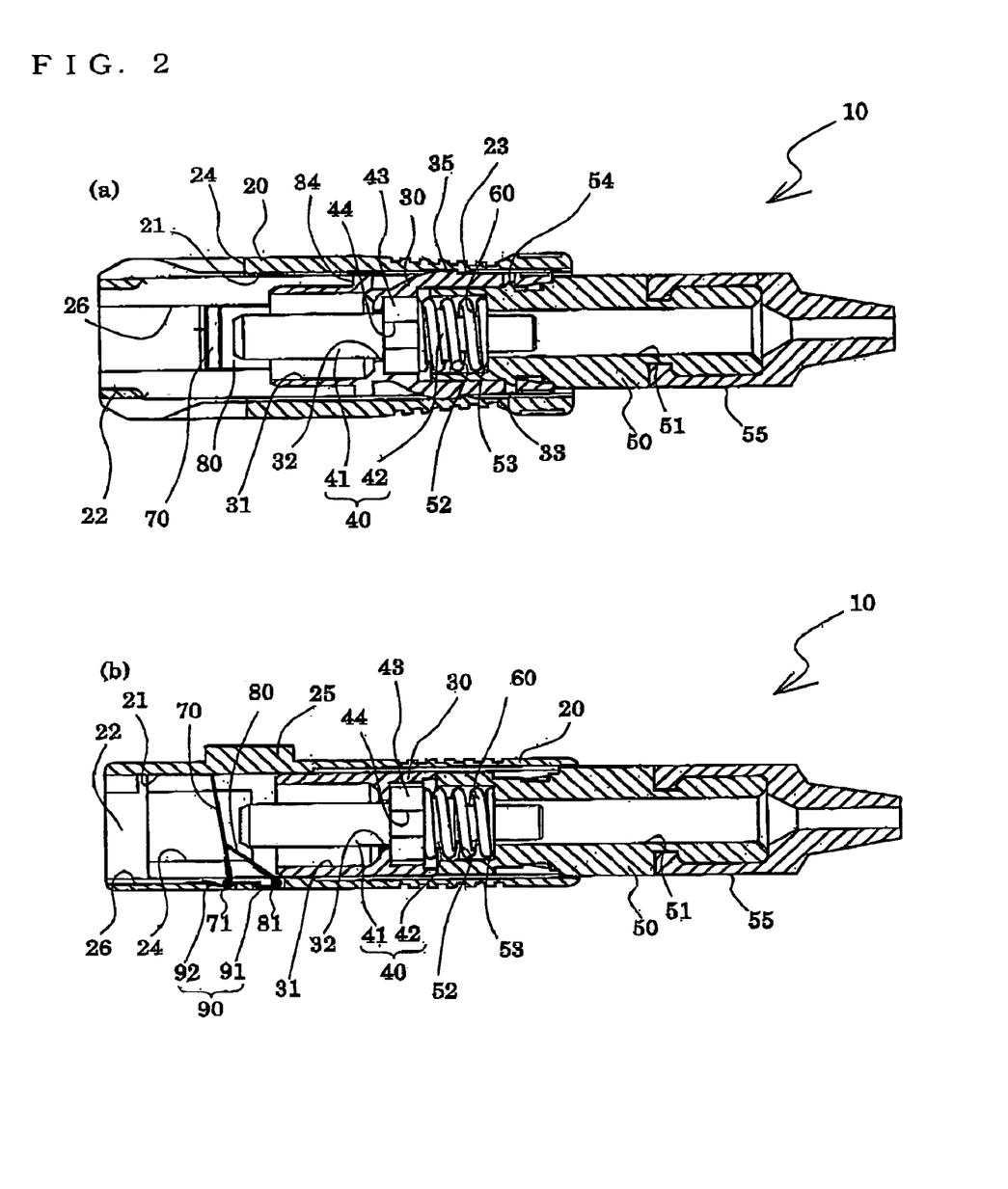
FIGS. 2A and 2B are sectional views of a main part of the optical connector plug according to the first embodiment of the present invention.

FIGS. 1A and 1B are a perspective view of an optical connector plug according to a first embodiment of the present invention and a plan view of the same, respectively. FIGS. 2A and 2B are sectional views taken along the lines A–A' and B–B' of FIG. 1B, respectively.

As shown in the drawings, an optical connector plug 10 of this embodiment has a plug housing 20, which is fit in an SC type optical connector adapter, a plug frame 30, which is held in the plug housing 20 in a manner that allows the plug frame 30 to move in the axial direction, a ferrule 40, which holds optical fibers to be connected optically and which is inserted from the back of the plug frame 30, a stop ring 50, whose front end engages with the rear end of the plug frame 30, and a biasing spring 60, which is held between the ferrule 40 and the stop ring 50 to bias the ferrule 40 toward the front end in the axial direction.

The ferrule 40 is, as shown in FIGS. 2A and 2B, composed of a ferrule cylindrical body 41, which has an outer diameter of 2.5 mm, and a flange member 42, which is fit with one end of the ferrule cylindrical body 41.

The ferrule cylindrical body 41 is shaped substantially like a cylinder, and has an optical fiber insertion hole (not shown in the drawings) piercing through its entire length in order to hold an optical fiber inserted therein. The ferrule cylindrical body 41 can be formed from, for example, ceramic materials such as zirconia (zirconium oxide), plastic materials, and glass materials such as crystallized glass, borosilicate glass, and quartz.

The flange member 42, which is fit with the rear end of the ferrule cylindrical body 41, has a jacketed fiber insertion hole (not shown in the drawings) piercing through its entire length in order to hold a jacketed fiber, which is obtained by coating a bare fiber (bare fiber refers to core and cladding), inserted therein. The flange member 42 also has a flange portion 43 formed along its outer circumference and protruding outward in the radial direction by a given distance.

Four key grooves 44 of the same width are formed at 90-degree intervals along the outer circumference of the flange portion 43, running the length of the flange portion 43. The key grooves 44 engage with the plug frame 30, details of which will be described later, to thereby restrict the rotational movement of the ferrule 40 about its axis with respect to the plug frame 30.

The number, position, depth, shape and the like of the key grooves 44 are not particularly limited, and can be determined to suit the plug frame 30, which positions the ferrule 40.

No particular limitation is put on the material of the flange member 42. For example, metal materials such as stainless steel, brass, and iron, and resin materials such as plastic can be employed. The flange member 42 in this embodiment is formed of stainless steel.

The plug frame 30 is shaped like an angular column that is hollow, and has a ferrule insertion hole 31 piercing through its entire length so that the ferrule 40 and the biasing spring 60 are inserted therein. The ferrule insertion hole 31 is provided with a ferrule protrusion hole 32, whose inner diameter is larger than the outer diameter of the ferrule cylindrical body 41 and is smaller than the diameter of the flange portion 43 in order to allow only the front end of the ferrule cylindrical body 41 to protrude.

Two projections (not shown in the drawings) are formed inside the ferrule insertion hole 31 to protrude inward in the radial direction and engage with the key grooves 44 of the ferrule 40. The plug frame 30 also has, as shown in FIG. 2A, two engagement holes 33, which are communicated with the ferrule insertion hole 31 and opened on outer walls of the plug frame 30. The engagement holes 33 are engaged with an engagement projection 54, details of which will be described later, to thereby engage the plug frame 30 and the stop ring 50 with each other.

A second projection 34 and a second restrictive projection 35 are formed as a pair on one outer face of the plug frame 30 and another pair of the second projection 34 and the second restrictive projection 35 is formed on the opposing outer face of the plug frame 30. When the plug frame 30 is held inside the plug housing 20, details of which will be described later, the second projection 34 and the second restrictive projection 35 restrict the movement of the plug frame 30 toward the front and rear ends in the axial direction, allowing the plug frame 30 to move by only a given amount in the axial direction.

The stop ring 50, which is fit with the rear end of the plug frame 30, is a metal or resin (e.g., plastic) cylinder with a jacketed fiber insertion hole 51 piercing through its entire length to receive a jacketed fiber inserted therein. A communication hole 52 in which the biasing spring 60 is inserted is formed on the front end side of the jacketed fiber insertion hole 51. The difference in inner diameter between the jacketed fiber insertion hole 51 and the communication hole 52 provides a stepped portion 53.

Held inside the communication hole 52, the biasing spring 60 in turn receives the rear end of the flange member 42 of the ferrule 40 inserted therein. As one end of the biasing spring 60 comes into contact with the rear end face of the flange portion 43, the other end of the biasing spring 60 is brought into contact with the stepped portion 53 of the stop ring 50. This biases the ferrule 40 toward its front end while at the same time restricting the forward movement of the ferrule 40 with respect to the plug frame 30 by pressing the front end face of the flange portion 43 against the edge of the ferrule protrusion hole 32.

At this point, the front end face of the ferrule 40 is protruding from the front end face of the plug frame 30 by, in this embodiment, 1.65 to 2.20 mm.

The ferrule 40 biased and held in the plug frame 30 is also restricted in rotational movement about its axis by the key grooves 44 of the flange portion 43 being engaged with the projections inside the ferrule insertion hole 31 as described above.

The engagement projection 54 is, as shown in FIG. 2A, formed along the outer circumference of the stop ring 50 on the front end side to protrude in the engagement holes 33 of the plug frame 30. The engagement projection 54 is decreased in outer diameter toward its front end to have a tapered outer circumferential wall, and is fixed by engaging with the engagement holes 33 of the plug frame 30.

The rear end of the stop ring 50 is fit with a boot 55. The boot 55 holds an optical fiber cable obtained by further coating a jacketed fiber, which is obtained by coating a bare fiber. An elastic material such as rubber or a resin material such as plastic is employed to form the boot 55. The boot 55 is gripped when the plug frame 30 is moved inside the plug housing 20 (details will be described later), and a material that is easy to grip should be chosen for the boot 55.

As shown in FIG. 2A, the plug housing 20 is shaped like an angular column that is hollow, and has along its length a plug frame holding hole 21 in which the plug frame 30 holding the ferrule 40 is held in a manner that allows the plug frame 30 to move in the axial direction.

A first projection 22 is formed on the front end side of the plug housing 20 to protrude in the plug frame holding hole 21. The second projection 34 provided on an outer wall of the plug frame 30 is pressed against the first projection 22, thereby restricting the axial movement of the plug frame 30 toward the front end with respect to the plug housing 20.

A first restrictive projection 23 protruding in the plug frame holding hole 21 and sloped down toward its rear end is formed on the rear end side of the plug housing 20. The first restrictive projection 23 engages with the second restrictive projection 35 provided on an outer wall of the plug frame 30, so that the plug frame 30 is held in the plug housing 20 while restricted in axial movement toward the rear end.

In short, the plug frame 30 is held between the first projection 22 and first restrictive projection 23 of the plug housing 20 with only a given amount of axial movement allowed.

The optical connector plug 10 is optically connected to another optical connector plug through an optical connector adaptor when, in this embodiment, the plug frame 30 reaches the front end side of the plug housing 20. Therefore, the position of the plug frame 30 with respect to the plug housing 20 at which the optical connector plug 10 is optically connected is called an optical connection position. On the other hand, the optical connector plug 10 is optically disconnected when the plug frame 30 is moved to the rear end side of the plug housing 20, and this position of the plug frame 30 with respect to the plug housing 20 is called a housing position. At the housing position, the front end face of the ferrule 40 is shielded by a shielding plate 70, details of which will be described later.

Compared to conventional plug frames for SC type optical connector plugs, the plug frame 30 can be pulled back deeper to the rear of the plug housing 20. Despite this fact, the plug frame 30 of this embodiment is not different from conventional plug frames for SC type optical connector plugs in terms of structure. What enables the plug frame 30 of this embodiment to go back deeper is the plug frame holding hole 21 of the plug housing 20 which is sized such that the first restrictive projection 23 is created on the rear end side of the plug frame holding hole 21 and is engaged with the second restrictive projection 35 to thereby restrict the backward movement of the plug frame 30, whereas in conventional SC type optical connector plugs the backward movement of the plug frame 30 is restricted by making the second restrictive projection 35 of the plug frame 30 protrude in a communication hole, which is provided on the front end side of the plug housing to connect the plug frame holding hole to the outside, and by pressing the second restrictive projection 35 against the edge of the communication hole.

As shown in FIG. 2A, communication holes 24 for connecting the plug frame holding hole 21 to the outside are opened on two opposing outer faces of the plug housing 20 in the region where the first projection 22 is provided. Through the communication holes 24, a claw portion of the optical connector adapter (not shown) is engaged with the second restrictive projection 35 of the plug frame 30.

One of the remaining outer faces (where no communication holes 24 are opened) of the plug housing 20 has, as shown in FIGS. 1A and 1B and FIG. 2B, a protruding key 25 for positioning the plug housing 20 in the rotational direction about the axis with respect to the optical connector adapter when the plug housing 20 is connected to the optical connector adapter.

The plug housing 20 has the shielding plate 70 whose proximal end is held to one side of the inner wall of the plug frame holding hole 21 in a manner that allows the shielding plate 70 to tilt, and an operating plate 80 held at a position nearer to the center of the optical connector plug 10 than the shielding plate 70. The operating plate 80 can be tilted to bring its distal end into contact with the shielding plate 70. The plug housing 20 also has a biasing and holding means 90 for biasing and positioning the shielding plate 70 and the operating plate 80 at a shielding position, where the shielding plate 70 is tilted until it faces the front end face of the ferrule 40.

The shielding plate 70 is a plate-like member, and its proximal end is held, in a tiltable manner, through a shielding plate axis 71 to one side of the inner wall of the plug frame holding hole 21, in this embodiment, to one of the opposing faces of the plug housing 20 that have no communication holes 24 opened.

The shielding plate 70 can rotate about the shielding plate axis 71 to move its distal end that is in contact with the one side of the inner wall of the plug frame holding hole 21 that has the shielding plate axis 71, at a point nearer to the front end of the plug housing 20 than the shielding plate axis 71, toward the other side of the inner wall of the plug frame holding hole 21 that is opposite to the one side where the proximal end of the shielding plate 70 is held. The shielding plate 70 is long enough to bring its distal end into contact with the other side of the inner wall of the plug frame holding hole 21 at a given angle of gradient when the distal end is moved to the other side of the inner wall of the plug frame holding hole 21.

The shielding plate 70 is tilted between its shielding position and unshielding position. At the shielding position, the distal end of the shielding plate 70 is in contact with the other side of the inner wall of the plug frame holding hole 21 so as to close the hole, thereby shielding the front end face of the ferrule 40. At the unshielding position, the distal end of the shielding plate 70 is in contact with the one side of the inner wall of the plug frame holding hole 21 that has the shielding plate axis 71, thereby allowing the plug frame 30 to move.

The operating plate 80 is a plate-like member, and is held, in a tiltable manner, through an operating plate axis 81 to the one side of the inner wall of the plug frame holding hole 21 which is the side where the proximal end of the shielding plate 70 is held. The distal end of the operating plate 80 is in contact with the shielding plate 70 to enable the biasing and holding means 90, which will be described later, to tilt the operating plate 80 together with the shielding plate 70.

The shielding plate 70 and the operating plate 80 are arranged in a suitable manner that can avoid interference with the ferrule 40 and the plug frame 30 when in the shielding position, as well as a contact with, and resultant damage to the shielding plate 70 from, a split sleeve or other member in the optical connected adapter when the optical connector plug 10 is connected to the optical connector adapter.

Any durable material, including stainless steel and other metal materials and plastic and other resin materials, can be employed for the shielding plate 70 and the operating plate 80 with no particular limitations. The shielding plate 70 and the operating plate 80 in this embodiment are formed of stainless steel.

In order to prevent the shielding plate 70 and the operating plate 80 in the unshielding position from coming into contact with the plug frame 30 and restricting the movement of the plug frame 30, the shielding plate 70 and the operating plate 80 in the unshielding position are housed in a housing portion 26, which is provided in the plug frame holding hole 21 of the plug housing 20.

The biasing and holding means 90 biases the shielding plate 70 and the operating plate 80 to position the shielding plate 70 at the shielding position. Specifically, the biasing and holding means 90 of this embodiment is composed of an operating plate biasing means 91, which is a spring placed on the proximal end side of the operating plate 80 to provide a biasing force that brings the operating plate 80 from the shielding position to the unshielding position, and a shielding plate biasing means 92, which is a spring placed on the proximal end side of the shielding plate 70 to provide a biasing force that brings the shielding plate 70 from the unshielding position to the shielding position and that is larger than the biasing force of the operating plate biasing means 91.

Biased by the operating plate biasing means 91 in the direction that causes a shift from the shielded state to the unshielded state, the operating plate 80 has its distal end kept in contact with the shielding plate 70. This prevents the operating plate 80 from bumping into the front end face of the ferrule 40 and scarring the front end face of the ferrule 40 and the front end face of the optical fiber when the plug frame 30 is moved to its housing position.

The shielding plate biasing means 92 biases the shielding plate 70, against the biasing force of the operating plate biasing means 91, in the direction that causes a shift from the unshielding position to the shielding position. The shielding plate 70 is thus biased and brought to the shielding position by the shielding plate biasing means 92 when the plug frame 30 is moved to the housing position in the plug housing 20. As a result, the shielding plate 70 shields the front end face of the ferrule 40 and prevents the optical connector plug 10 from radiating light from its tip.

When the plug frame 30 is moved to the optical connection position with respect to the plug housing 20, a front edge of the plug frame 30 comes into contact with the operating plate 80, to thereby tilt the operating plate 80, and the distal end of the tilted operating plate 80 pushes the shielding plate 70 while resisting the biasing force of the shielding plate biasing means 92, to thereby tilt the shielding plate 70 until it reaches the unshielding position.

Figure 3:
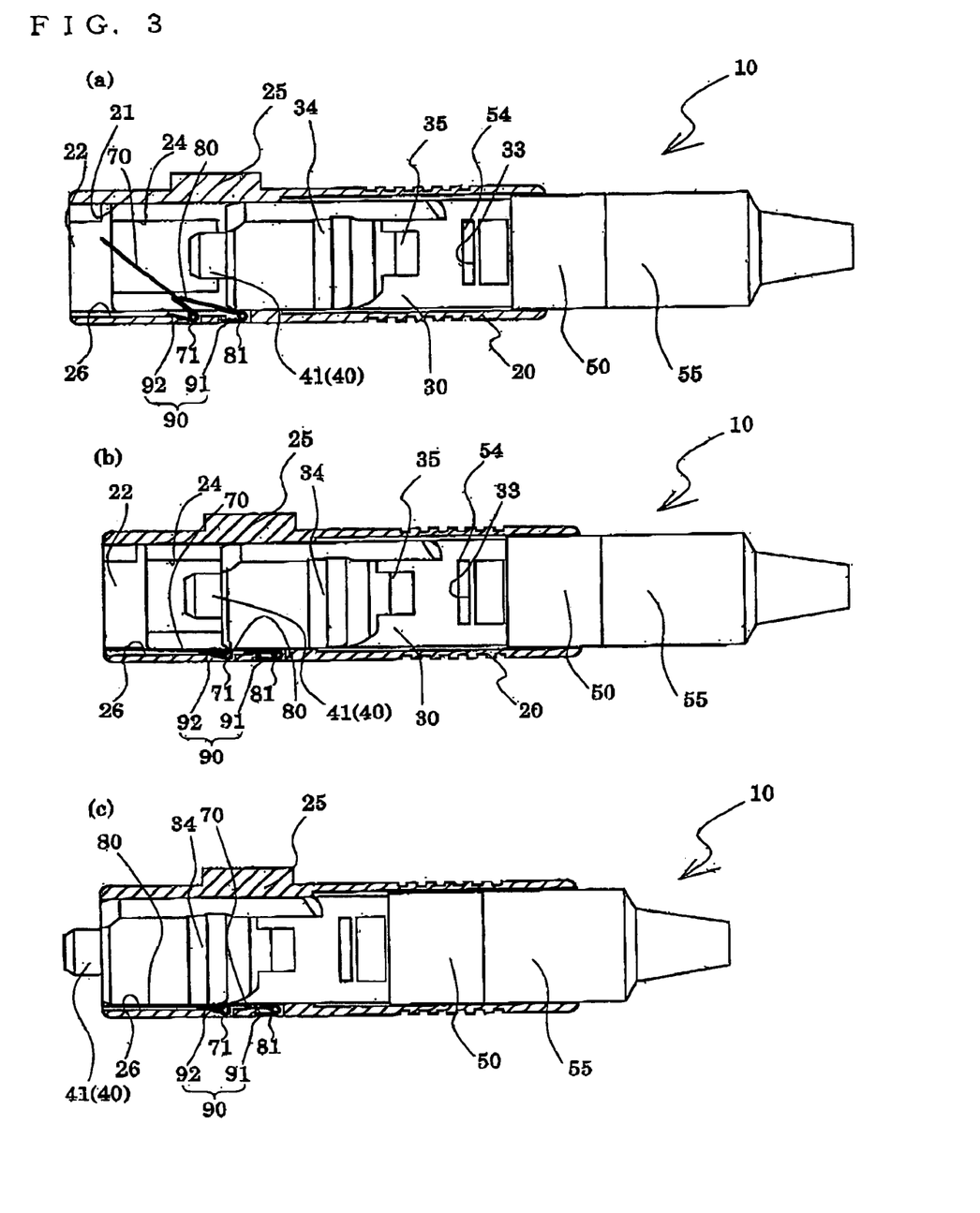
FIGS. 3A to 3C are sectional views showing the operation of a shielding plate of the optical connector plug according to the first embodiment of the present invention.

A detailed description is given on the operation of the shielding plate 70 and operating plate 80 of the optical connector plug 10. FIGS. 3A to 3C show a main part in section to illustrate the operation of the shielding plate according to the first embodiment.

At the housing position where the plug frame 30 is on the rear end side of the plug housing 20 as shown in FIG. 2B, the shielding plate 70 is biased by the shielding plate biasing means 92 against the biasing force of the operating plate biasing means 91 which biases the operating plate 80. This brings the distal end of the shielding plate 70 into contact with the other side of the inner wall of the plug frame holding hole 21 which is opposite to the one side of the inner wall of the plug frame holding hole 21 where the proximal end of the shielding plate 70 is held. The shielding plate 70 is thus fixed to the shielding position and shields the front end face of the ferrule 40 to block light radiated from the front end face of the ferrule 40.

Fixed to the shielding position with its distal end pressed against the other side of the inner wall of the plug frame holding hole 21 which is opposite to the one side of the inner wall of the plug frame holding hole 21 where the proximal end is held, the shielding plate 70 does not come into contact with the front end face of the ferrule 40 and therefore causes no stain or scar on the front end face of the ferrule 40.

The operating plate 80, too, does not come into contact with the front end face of the ferrule 40 and therefore causes no stain or scar on the front end face of the ferrule 40 since, at the shielding position, the operating plate 80 is biased by the operating plate biasing means 91 toward the shielding plate 70.

Then the plug frame 30 is moved to the front end side of the plug housing 20 as shown in FIG. 3A. The movement brings the front edge of the plug frame 30 into contact with the operating plate 80 and tilts the operating plate 80 before the front end face of the ferrule 40 bumps into the shielding plate 70. The distal end of the tilted operating plate 80 pushes the shielding plate 70 while resisting the biasing force of the shielding plate biasing means 92, thereby tilting the shielding plate 70.

The plug frame 30 is then moved further toward the front end of the plug housing 20 as shown in FIG. 3B. The movement causes the front edge of the plug frame 30 to push the operating plate 80 down further, and brings the shielding plate 70 to the unshielding position where the shielding plate 70 leans toward the one side of the inner wall of the plug frame holding hole 21 in the plug housing 20. At this point, the shielding plate 70 and the operating plate 80 are housed in the housing portion 26 of the plug housing 20 instead of protruding in the plug frame holding hole 21, and the plug frame 30 is thus allowed to move to the optical connection position.

As shown in FIG. 3C, the plug frame 30 moves to the optical connection position with respect to the plug housing 20 while the shielding plate 70 and the operating plate 80 are at the unshielding position, in other words, while the plates 70 and 80 are housed in the housing portion 26. The shielding plate 70 and the operating plate 80 held at the unshielding position are tilted toward the one side of the inner wall of plug frame holding hole 21 on an outer wall of the plug frame 30.

When the plug frame 30 is moved back to the housing position in the plug housing 20, on the other hand, the biasing force of the shielding plate biasing means 92 tilts the shielding plate 70 at the unshielding position toward the shielding position and brings the distal end of the shielding plate 70 into contact with the inner wall of the plug frame holding hole 21, thereby fixing the shielding plate to the shielding position. Positioned at the shielding position, the shielding plate 70 shields the front end face of the ferrule 40.

Thus the shielding plate 70 can readily and surely be tilted between the shielding position, at which the shielding plate 70 shields the front end face of the ferrule 40, and the unshielding position, at which the optical connector plug 10 is brought to the optical connection position, by merely moving the plug frame 30 inside the plug housing 20. As a result, the front end face of the ferrule 40 is shielded with ease and without fail for the purpose of preventing the optical connector plug 10 from radiating light from its tip. This enhances the safety of the optical connector plug 10 and at the same time simplifies and ensures optical connection of the optical connector plug 10.

In addition, with the shielding plate 70 and the operating plate 80 placed inside the plug frame holding hole 21, the optical connector plug 10 can have contours identical with those of conventional SC type optical connector plugs. This enables the optical connector plug 10 to connect to conventional SC type optical connector adapters, and thus keeps the manufacture cost and introduction cost low.

The optical connector plug 10 of this embodiment employs, as shown in FIGS. 2A and 2B, for the plug frame 30, the ferrule 40 and the biasing spring 60, the same types that are used in conventional SC type optical connector plugs. This also keeps the manufacture cost low. The stop ring 50 can be of the same type that is used in conventional SC type optical connector plugs, or may have a longer rear end than the one used in conventional SC optical connector plugs since the plug frame 30 is moved by gripping the rear end side of the stop ring 50 in this embodiment. Alternatively, the boot 55 may be made longer than usual while employing the same type of stop ring as conventional optical connector plugs.

The above-described series of operation of moving the shielding plate 70 from the shielding position to the unshielding position is carried out by inserting, for connection, the optical connector plug 10 to the optical connector adapter (not shown) while gripping the rear end side of the plug frame 30, in this embodiment, the stop ring 50 and the boot 55. In other words, when the optical connector plug 10 is inserted to the optical connector adapter by gripping the stop ring 50 and the boot 55, the plug housing 20 is inserted to the optical connector adapter to be limited in movement in the insertion directions and the plug frame 30 alone is allowed to reach the optical connection position, which is on the front end side of the plug housing 20. The shielding plate 70 is thus tilted from the shielding position to the unshielding position as described above.

To move the shielding plate 70 reversely, from the unshielding position to the shielding position, the plug housing 20 is gripped around its periphery and the optical connector plug 10 is pulled out of the optical connector adapter by a given amount until the optical connector plug 10 almost completely leaves the optical connector adapter. This movement disengages the claw portion of the optical connector adapter from the second projection 34 of the plug frame 30 through the communication holes 24 of the plug housing 20. Thereafter, the plug frame 30 is gripped to be pulled out and moved back to the housing position in the plug housing 20. As a result, the front end face of the plug frame 30 is shielded with the shielding plate 70.

The optical connector plug 10 of this embodiment can thus switch between a shielded state in which radiated right is blocked by the shielding plate 70 and an unshielded state in which light is radiated uninterrupted in conjunction with the movement of attaching to and detaching from an optical connector adapter. Accordingly, the optical connector plug 10 does not need to be in an unshielded state when connected to an optical connector adapter, and obtains a high level of safety by completely blocking light radiated from its tip even when it is not encased.

Second Embodiment

Figure 4:
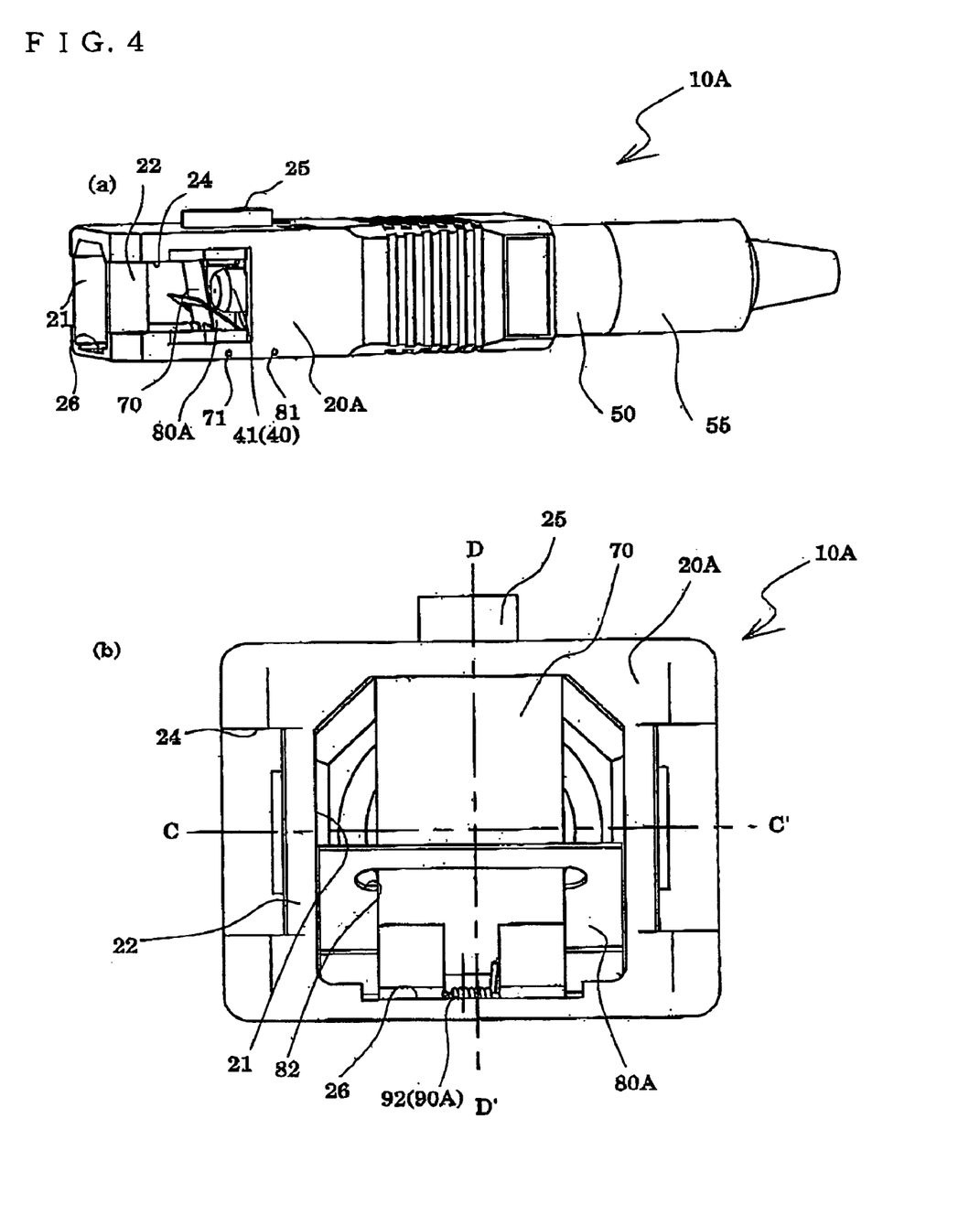
FIGS. 4A and 4B are a perspective view of an optical connector plug according to a second embodiment of the present invention and a plan view of the same, respectively.
Figure 5:
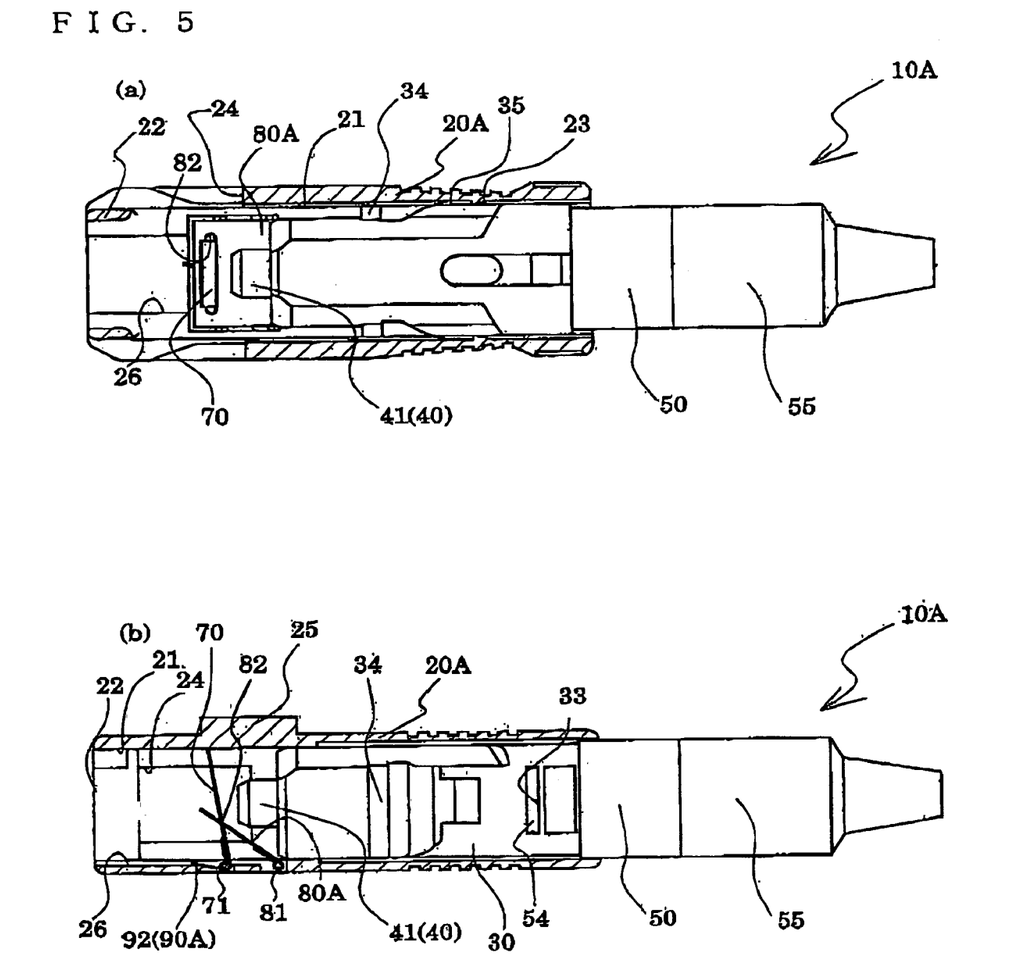
FIGS. 5A and 5B are sectional views of a main part of the optical connector plug according to the second embodiment of the present invention.

FIGS. 4A and 4B are a perspective view of an optical connector plug according to a second embodiment of the present invention and a plan view of the same, respectively. FIGS. 5A and 5B are sectional views of a main part, and are taken along the lines C–C' and D–D' of FIG. 4B, respectively. In this embodiment, members identical to those of the above embodiment are denoted by the same symbols and descriptions on such members will not be repeated.

As shown in the FIGS. 4A and 4B and FIGS. 5A and 5B, an optical connector plug 10A has a plug housing 20A in which the plug frame 30 similar to the one in the above-described first embodiment is held in a movable manner. The plug frame 30 holds the ferrule 40, the stop ring 50, and a biasing spring (not shown).

The plug housing 20 has the plug frame holding hole 21. Proximal ends of a shielding plate 70 and an operating plate 80A are held through the shielding plate axis 71 and the operating plate 81, respectively, to one side of the inner wall of the plug frame holding hole 21.

The shielding plate 70 is, as in the first embodiment described above, long enough to bring its distal end into contact with the other side of the inner wall of the plug frame holding hole 21 which is opposite to the one side of the inner wall of the plug frame holding hole 21 where the proximal end is held.

The operating plate 80A is wider than the shielding plate 70, and has in its distal end an insertion hole 82 through which the shielding plate 70 is inserted.

When in the shielding position, the shielding plate 70 is inserted in the insertion hole 82 and thereby restricts the tilt of the operating plate 80A toward the front end face of the ferrule 40. A biasing and holding means 90A of this embodiment therefore consists solely of the shielding plate biasing means 92, which is placed on the proximal end of the shielding plate 70 to provide a biasing force that moves the shielding plate 70 from the unshielding position to the shielding position.

The above-described construction also makes it possible, as in the first embodiment, to readily and surely tilt the shielding plate 70 between the shielding position, at which the shielding plate 70 shields the front end face of the ferrule 40, and the unshielding position, at which the optical connector plug 10A is brought to the optical connection position, by merely moving the plug frame 30 inside the plug housing 20B. As a result, the front end face of the ferrule 40 is shielded with ease and without fail for the purpose of preventing the optical connector plug 10A from radiating light from its tip. This enhances the safety of the optical connector plug 10A and at the same time simplifies and ensures optical connection of the optical connector plug 10A.

In addition, with the shielding plate 70 and the operating plate 80A placed inside the plug housing 20B, the optical connector plug 10A can have contours identical with those of conventional SC type optical connector plugs. This enables the optical connector plug 10A to connect to conventional SC type optical connector adapters, and thus keeps the manufacture cost and introduction cost low.

Furthermore, the manufacture process is simplified since only the shielding plate biasing means 92 of the shielding plate 70 is needed as the biasing and holding means 90A to bias and position the shielding plate 70 and the operating plate 80A.

While only the shielding plate biasing means 92, which biases the shielding plate 70 in the direction that causes a shift from the unshielding position to the shielding position, is provided as the biasing and holding means 90A in this embodiment, this should not be construed restrictively. For instance, the biasing and holding means 90A may consist only of a biasing and holding means that biases the operating plate 80A in the direction that causes a shift from the unshielding position to the shielding position, or may be composed of the shielding plate biasing means 92 and the operating plate biasing means 91 both as in the first embodiment.

The shielding plate 70, which in this embodiment has such a length that its distal end comes into contact with the inner wall of the plug frame holding hole 21 thus fixing the shielding plate 70 to the shielding position, may not be that long since the operating plate 80A restricts the tilt of the shielding plate 70 toward the front end face of the ferrule 40. However, the shielding plate still has to be long enough to not slip out of the insertion hole 82 of the operating plate 80A when in the non-shielding position.

Third Embodiment

Figure 6:
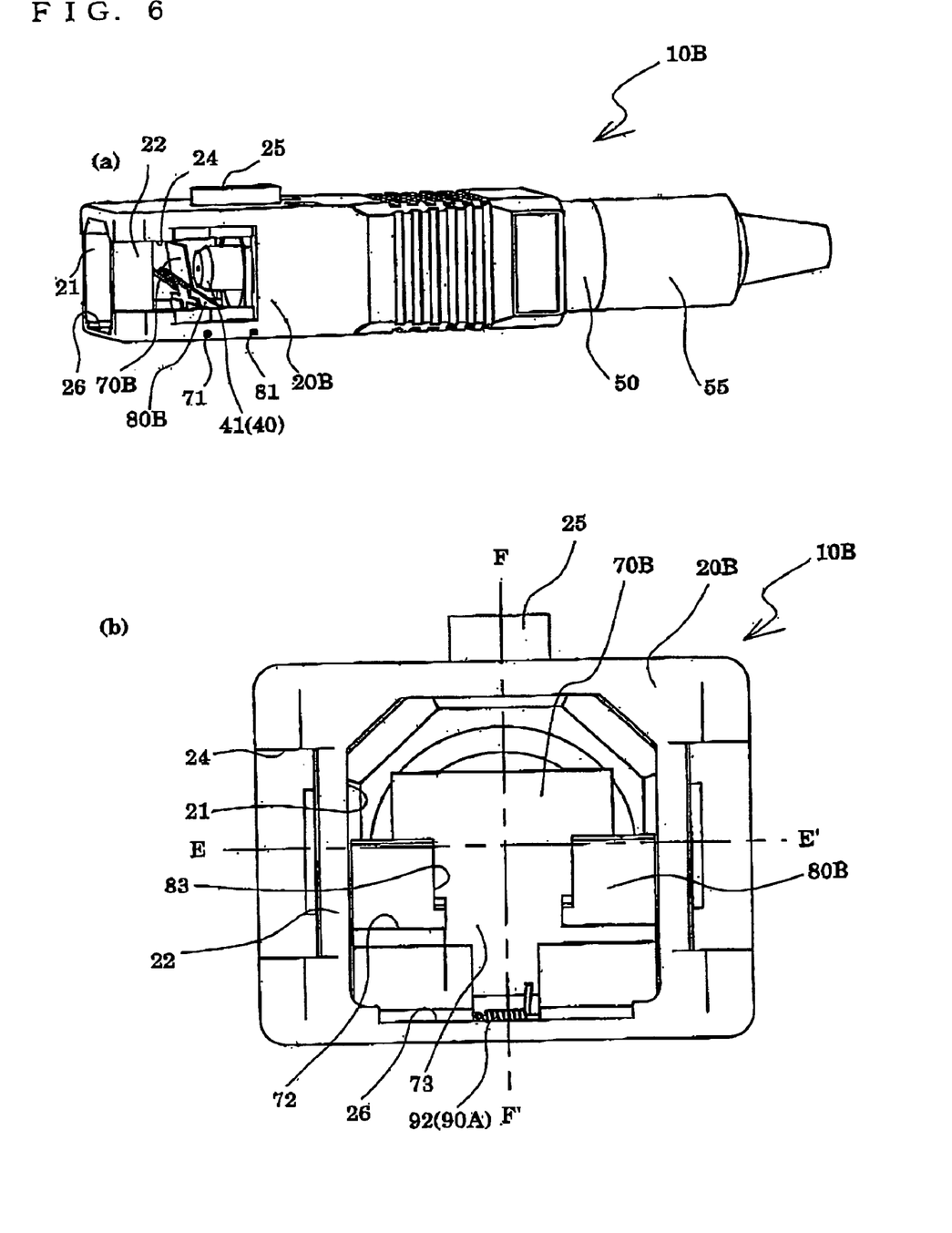
FIGS. 6A and 6B are a perspective view of an optical connector plug according to a third embodiment of the present invention and a plan view of the same, respectively.
Figure 7:
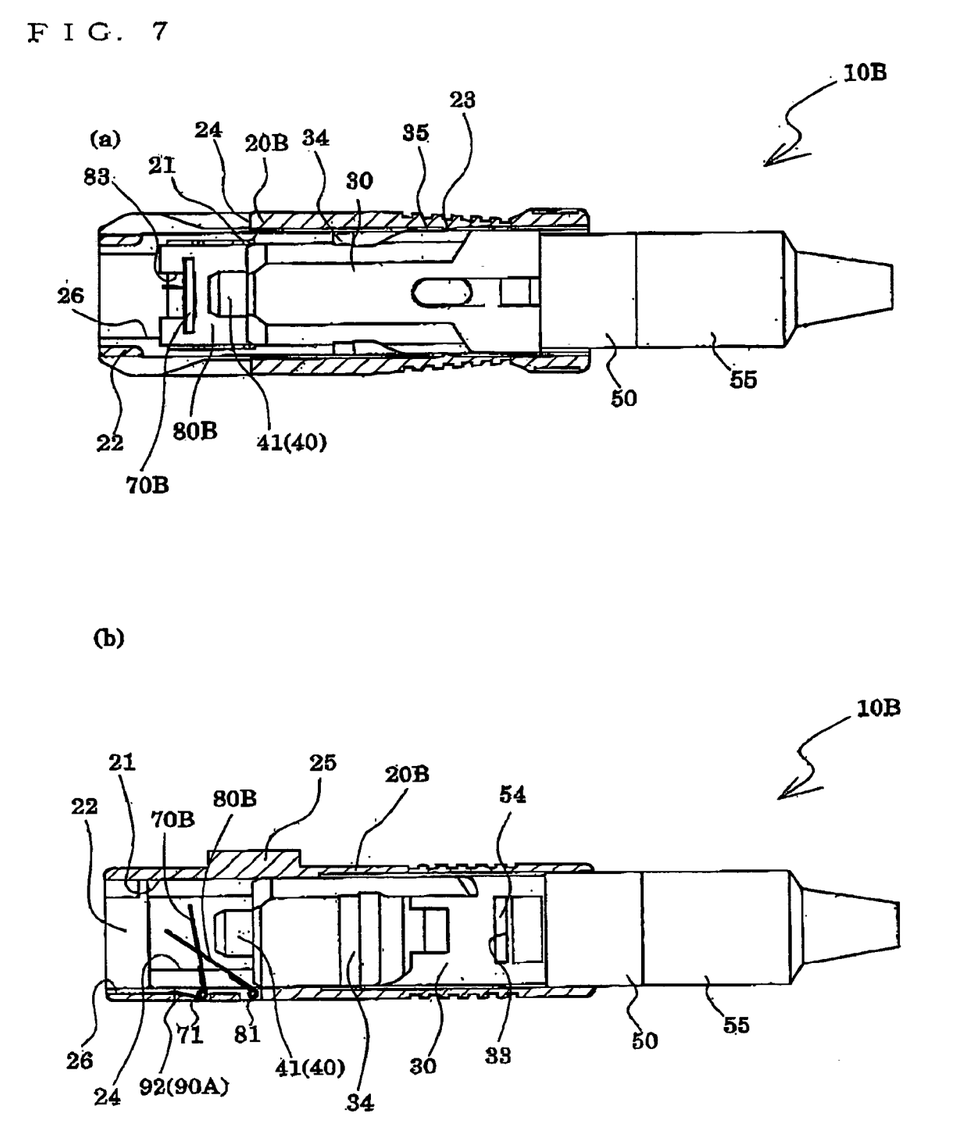
FIGS. 7A and 7B are sectional views of a main part of the optical connector plug according to the third embodiment of the present invention.

FIGS. 6A and 6B are a perspective view of an optical connector plug according to a third embodiment of the present invention and a plan view of the same, respectively. FIGS. 7A and 7B are sectional views of a main part, and are taken along the lines E–E' and F–F' of FIG. 6B, respectively. In this embodiment, members identical to those of the above embodiments are denoted by the same symbols and descriptions on such members will not be repeated.

As shown in the FIGS. 6A and 6B and FIGS. 7A and 7B, an optical connector plug 10B has a plug housing 20B in which the plug frame 30 similar to the one in the above-described first embodiment is held in a movable manner. The plug frame 30 holds the ferrule 40, the stop ring 50, and a biasing spring (not shown).

The plug housing 20B has the plug frame holding hole 21. Proximal ends of a shielding plate 70B and an operating plate 80B are held through the shielding plate axis 71 and the operating plate axis 81 in a tiltable manner, respectively, to one side of the inner wall of the plug frame holding hole 21.

Each side in the width direction of the shielding plate 70B is notched, forming a pair of notch portions 72. The two notch portions 72 leave a narrow-width portion 73 in the middle.

The operating plate 80B is wider than the shielding plate 70B, and has about its center an open-end slot 83 running along its length. The open end of the slot 83 is at the edge on the distal end side of the operating plate 80B. The width of the slot 83 is smaller than that of the shielding plate 70B and is slightly larger than that of the narrow-width portion 73. The narrow-width portion 73 of the shielding plate 70B is inserted in the slot 83 of the operating plate 80B to engage the shielding plate 70B and the operating plate 80B with each other.

With the shielding plate 70B and the operating plate 80B engaged with each other on the distal end side, the operating plate 80B restricts the tilt of the shielding plate 70B at the shielding position toward the front end face of the ferrule 40. This restrictive effect is exerted when the shielding plate axis 71 of the shielding plate 70B, the operating plate axis 81 of the operating plate 80B, and the intersecting point between the shielding plate 70B and the operating plate 80B, form a given arrangement.

The shielding plate 70B can therefore be fixed to the shielding position without having such a length that its distal end comes into contact with the other side of the inner wall of the plug frame holding hole 21 which is opposite to the one side of the inner wall of the plug frame holding hole 21 where the proximal end of the shielding plate 70B is held. As a result, the shielding plate axis 71 about which the shielding plate 70B is tilted can be placed on the front end side of the plug housing 20B.

When in the shielding position, the shielding plate 70B is inserted in the slot 83 and thereby restricts the tilt of the operating plate 80B toward the front end face of the ferrule 40. A biasing and holding means 90A of this embodiment therefore consists solely of the shielding plate biasing means 92, which is placed on the proximal end of the shielding plate 70B to apply a biasing force that moves the shielding plate 70B from the unshielding position to the shielding position.

The above-described construction makes it possible, as in the case of the first embodiment, to readily and surely tilt the shielding plate 70B between the shielding position, at which the shielding plate 70 shields the front end face of the ferrule 40, and the unshielding position, at which the optical connector plug 10B is brought to the optical connection position, by merely moving the plug frame 30 inside the plug housing 20B. As a result, the front end face of the ferrule 40 can be shielded with ease and without fail to prevent the optical connector plug 10B from radiating light from its tip. This enhances the safety of the optical connector plug 10B and at the same time simplifies and ensures the optical connection of the optical connector plug 10B.

In addition, with the shielding plate 70B and the operating plate 80B placed inside the plug housing 20B, the optical connector plug 10B can have contours identical with those of conventional SC type optical connector plugs. This enables the optical connector plug 10B to connect to conventional SC type optical connector adapters, and thus keeps the manufacture cost and introduction cost low.

Furthermore, the manufacture process is simplified since only the shielding plate biasing means 92 of the shielding plate 70B is needed as the biasing and holding means 90A to bias and position the shielding plate 70B and the operating plate 80B.

Although only the shielding plate biasing means 92, which biases the shielding plate 70B in the direction that causes a shift from the unshielding position to the shielding position, is provided as the biasing and holding means 90A in this embodiment, there are other options. For instance, the biasing and holding means 90A may consist of only a biasing and holding means that biases the operating plate 80B in the direction that causes a shift from the unshielding position to the shielding position, or may be composed of both of the shielding plate biasing means 92 and the operating plate biasing means 91 as in the first embodiment described above.

Fourth Embodiment

Figure 8:
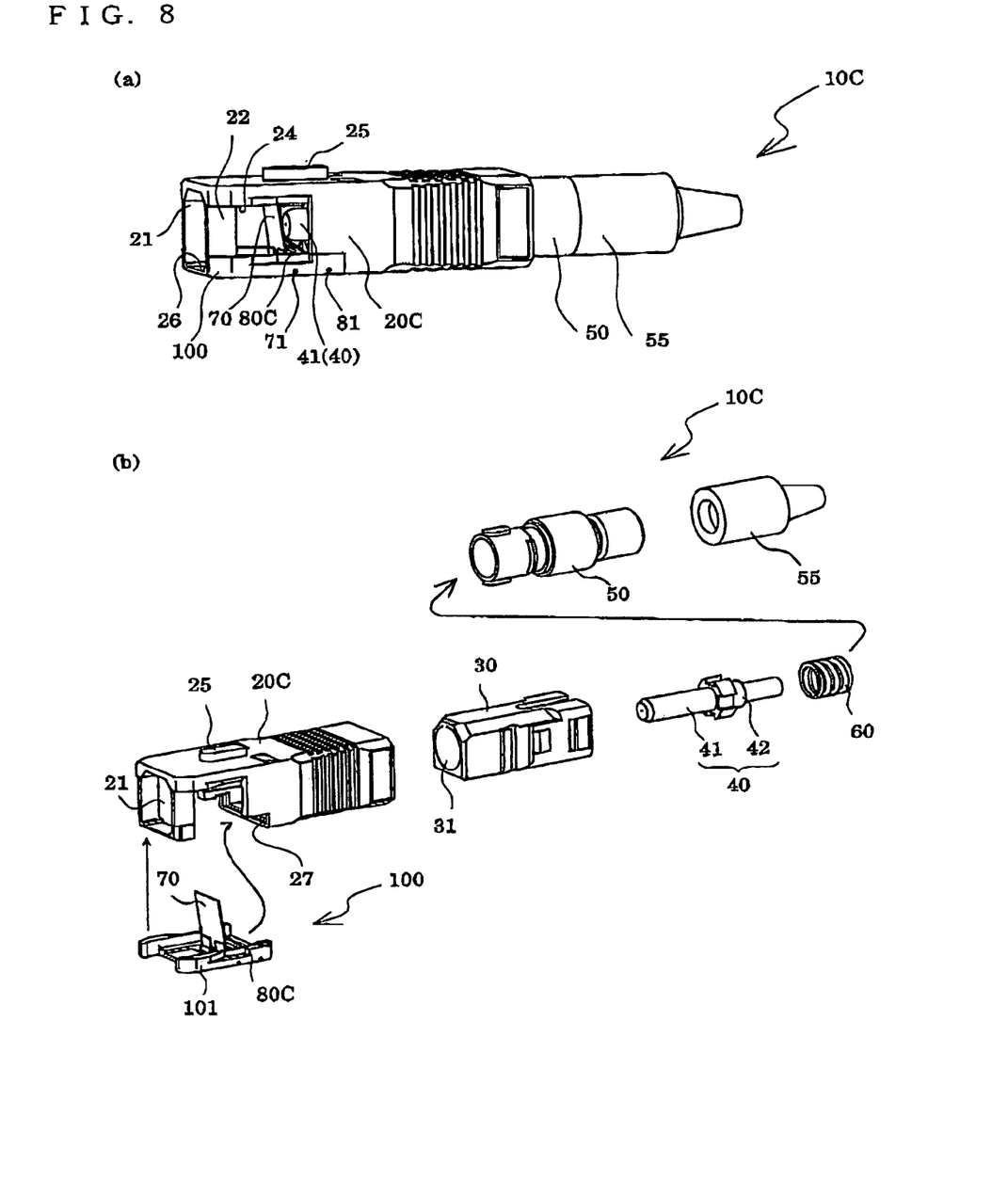
FIGS. 8A and 8B are a perspective view of an optical connector plug according to a fourth embodiment of the present invention and an exploded perspective view of the same, respectively.
Figure 9:
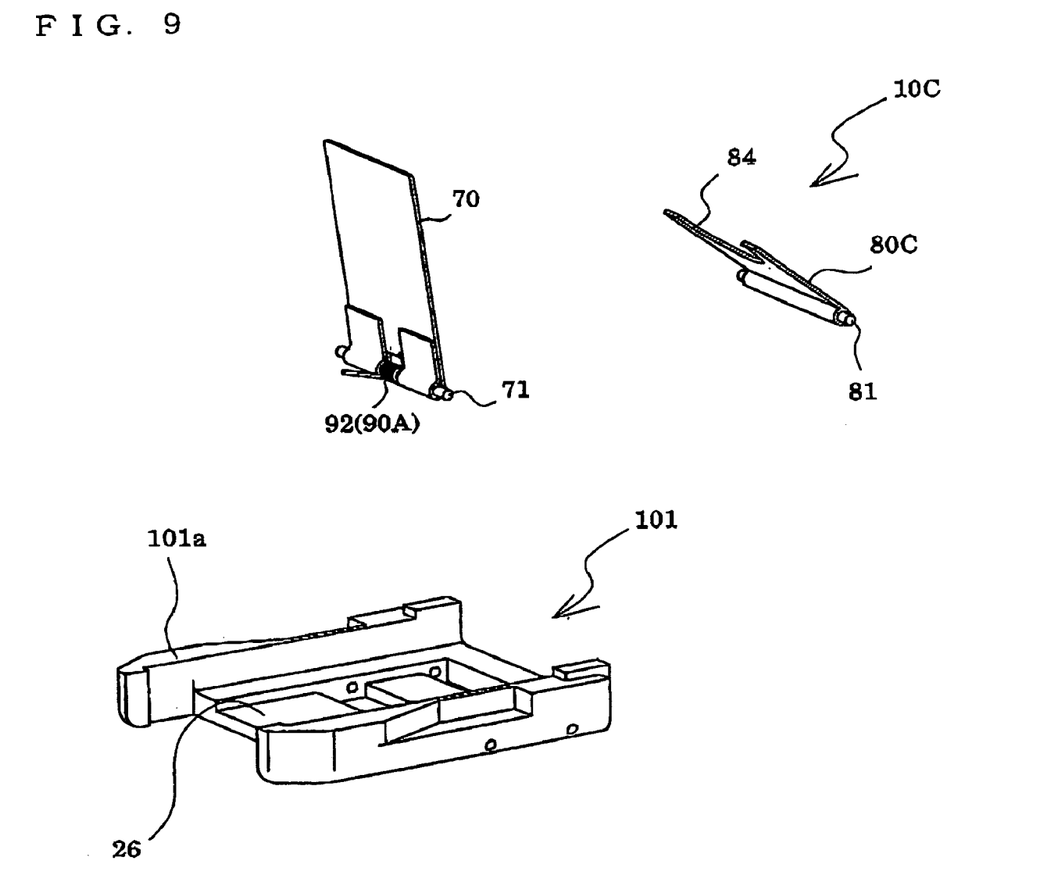
FIG. 9 is an exploded perspective view of a shielding plate assembly according to the fourth embodiment of the present invention.

FIGS. 8A and 8B are a perspective view of an optical connector plug according to a fourth embodiment of the present invention and an exploded perspective view of the same, respectively. FIG. 9 is an exploded perspective view of a shielding plate assembly. In this embodiment, members identical to those of the above embodiments are denoted by the same symbols and descriptions on such members will not be repeated.

As shown in FIGS. 8A and 8B, an optical connector plug 10C of this embodiment is identical with the optical connector plug 10 of the first embodiment, except for a shielding plate assembly 100 fixed to a plug housing 20C.

The shielding plate assembly 100 is composed of, as shown in FIG. 9, a shielding plate frame 101, the shielding plate 70 and an operating plate 80C, which are held to the shielding plate frame 101 rotatably, and the biasing and holding means 90A, which biases and positions the shielding plate 70 and the operating plate 80C.

The shielding plate frame 101 is a plate-like member, and has a housing portion 26 in which the shielding plate 70 and the operating plate 80C are housed in order to prevent the shielding plate 70 and the operating plate 80C at the unshielding position from restricting the movement of the plug frame 30. The housing portion 26 is thinner than areas to its left and right. The areas to the left and right of the housing portion 26 form a frame portion 101a, which holds the shielding plate 70 and the operating plate 80C in a tiltable manner and which enhances the rigidity of the shielding plate frame 101 itself. The contours of the shielding plate frame 101 match the contours of a part of the plug housing 20 of the first embodiment described above.

The shielding plate frame 101 is made by molding resin such as plastic. Molded from resin, the shielding plate frame 101 can easily produced in mass quantities with precision at low cost.

The shielding plate 70 is, as in the first embodiment, a plate-like member, and has its proximal end held through the shielding plate axis 71 to the frame portion 101a of the shielding plate frame 101 in a tiltable manner.

The operating plate 80C is a plate-like member, and has its proximal end held through the operating plate axis 81 to the frame portion 101a of the shielding plate frame 101 in a tiltable manner. A contact concave portion 84 is an arc-like cut-off portion on the distal end of the operating plate 80C which comes into contact with the shielding plate 70. The contact concave portion 84 of the operating plate 80C comes into contact with the outer wall of the ferrule cylindrical body 41 when the operating plate 80C tilts toward the ferrule 40 while the plug frame 30 is at the housing position. This is to prevent the distal end of the operating plate 80C from scuffing, by contact, the front end face of the ferrule cylindrical body 41 as the operating plate 80C is tilted, and to avoid resultant inconveniences such as increased loss of light in optical connection.

Any durable material, including metal materials such as stainless steel and resin materials such as plastic, can be employed for the shielding plate 70 and the operating plate 80C. The shielding plate 70 and the operating plate 80C in this embodiment are formed of stainless steel.

The biasing and holding means 90A consists of the shielding plate biasing means 92 as in the second embodiment described above. The shielding plate biasing means 92 is a spring placed on the proximal end of the shielding plate 70 to apply a biasing force that moves the shielding plate 70 from the shielding position to the unshielding position. In other words, the biasing and holding means 90A of this embodiment does not have the operating plate biasing means 91 and consists of only the shielding plate biasing means 92.

The shielding plate frame 101, the shielding plate 70, the operating plate 80C and the biasing and holding means 90A are assembled in advance to obtain the shielding plate assembly 100. The shielding plate assembly 100 is fixed to the plug housing 20C. A fixing hole 27 for connecting the plug frame holding hole 21 to the outside is opened on the side of the plug housing 20C that is opposite to the side where the key 25 is placed as shown in FIGS. 8A and 8B. The shielding plate assembly 100 is fit in the fixing hole 27 and is fixed by adhesion with the use of adhesive or by fusion. This enables the shielding plate 70 to tilt in the plug frame holding hole 21 of the plug housing and shield the front end of the ferrule 40.

The optical connector plug 10C of this embodiment improves the ease of assembling, cuts the assembly time short, and lowers the assembly cost, by fixing the preassembled shielding plate assembly 100, which is an assembly of the shielding plate frame 101, the shielding plate 70, the operating plate 80C and the biasing and holding means 90A, to the plug housing 20C.

The optical connector plug 10C of this embodiment employs, for the plug frame 30, the ferrule 40, the stop ring 50, the biasing spring 60 and others, the same types that are used in the conventional SC type optical connector plugs. The plug housing 20C, too, can keep the manufacture cost low since the plug housing 20C is obtained by merely opening the fixing hole 27, where the shielding plate assembly 100 is to be fixed, in a plug housing that is used in the conventional SC type optical connector plugs.

Other Embodiments

The present invention is not limited to the optical connector plug and the optical connector as described in each of the above embodiments.

For example, the SC type optical connector plugs 10 through 10C engaged with SC type optical connector adapters are given as an example in the above first through fourth embodiments. However, this should not be construed restrictively; the same effects can be obtained when the present invention is applied to, for example, MU type optical connector plugs and optical connectors. The present invention is also applicable to angled PC connectors in which a ferrule has a convex front end face slanted with respect to a plane that is orthogonal to the optical fiber axis. In such angled PC connectors, a large area is irradiated with light radiated from the front end face of the ferrule because of the slant of the front end face of the ferrule. Nevertheless, any shielding plate 70 or 70B of the first through fourth embodiments can shield the front end face of the ferrule for the angled PC connectors. The shielding plate 70B of the third embodiment described above, in particular, is wide in the area that actually blocks the radiated light, and accordingly serves as a more reliable shield against the radiated light.

In the first through fourth embodiments described above, the shielding plate 70 or 70B and the operating plate 80, 80A, 80B, or 80C are placed in the plug frame holding hole 21 on the side opposite to the side that has the key 25 of the plug housing 20, 20A, 20B or 20C. Where to place the shielding plate and the operating plate is not particularly limited as long as it is inside the plug frame holding hole 21.

While the shielding plate 70 or 70B and the operating plate 80, 80A, or 80B in the first through fourth embodiments described above are held by the shielding plate axis 71 and the operating plate axis 81, respectively, to the inner wall of the plug frame holding hole 21 in a manner that allows the plates to rotate, this should not be construed restrictively. Alternatively, the shielding plate and the operating plate may be leaf springs with their proximal ends fixed to the plug housing 20, 20A, 20B or 20C, or to the shielding plate frame 101, so that the shielding plate and the operating plate can be tilted in the plug frame holding hole 21. In this case, the shielding plate and the operating plate themselves function as a biasing and holding means, thereby making another biasing and holding means unnecessary.

According to the present invention, the shielding plate can be tilted to the shielding position, at which the shielding plate shields the front end face of the ferrule, by merely moving the plug frame inside the plug housing. As a result, the front end face of the ferrule is shielded with ease and without fail and the optical connector plug is prevented from radiating light from its tip. This enhances the safety of the optical connector plug. The shielding plate can also be tilted, by merely moving the plug frame inside the plug housing, to the unshielding position at which the plug frame is allowed to move to the optical connection position of the plug housing by the shielding plate. As a result, light radiated from the optical connector plug can readily and surely be unshielded for optical connection. In addition, with the shielding plate and the operating plate placed inside the plug frame holding hole, the optical connector plug of the present invention can have contours identical with those of conventional SC type or MU type optical connector plugs. This enables the optical connector plug of the present invention to connect to conventional SC type or MU type optical connector adapters, and thus keeps the manufacture cost and introduction cost low.

What is claimed is:

1. An optical connector plug comprising:
   a plug frame for holding a ferrule in which an optical fiber is held;
   a plug housing having a plug frame holding hole in which the plug frame is held in a manner that allows the plug frame to move axially, the plug frame holding hole piercing through the entire length of the plug housing;
   a shielding plate whose proximal end is held to one side of an inner surface of the plug frame holding hole of the plug housing in a manner that allows the shielding plate to tilt, and whose distal end moves between a shielding position, at which the shielding plate shields a front end face of the ferrule, and an unshielding position, at which the shielding plate allows the plug frame to move;
   an operating plate whose proximal end is held, in a tiltable manner, to the one side of the inner surface of the plug frame holding hole at a position nearer to the center of the optical connector plug than the shielding plate, and whose distal end is in contact with or is engaged with the shielding plate to tilt along with the shielding plate, the plug frame being capable of retracting, upon movement of the shielding plate to the shielding position, to a housing position at which no interference occurs with the shielding plate and the operating plate; and
   biasing and holding means for biasing and positioning the shielding plate and the operating plate in a manner that brings the shielding plate to the shielding position as the plug frame moves to the housing position,
   wherein, when the plug frame is moved toward a front end of the plug housing, the operating plate is tilted by this movement of the plug frame, and the tilted operating plate pushes the shielding plate to the unshielding position, allowing the plug frame to move to an optical connection position with respect to the plug housing.

2. An optical connector plug according to claim 1, wherein the shielding plate and the operating plate are positioned at the shielding position as the distal end of the shielding plate comes into contact with the other side of the inner surface of the plug frame holding hole that is opposite to the side where the proximal end of the shielding plate is held.

3. An optical connector plug according to claim 1, wherein the shielding plate and the operating plate are positioned and held at the shielding position by engagement of the shielding plate with the operating plate at the shielding position.

4. An optical connector plug according to claim 1,
   wherein the distal end of the operating plate is in contact with the shielding plate, and
   wherein the biasing and holding means comprises operating plate biasing means for biasing the operating plate in a direction that causes a shift from the shielding position to the unshielding position, and shielding plate biasing means for biasing, with a larger biasing force than that of the operating plate biasing means, the shielding plate in a direction that causes a shift from the unshielding position to the shielding position.

5. An optical connector plug according to claim 3,
   wherein the distal end side of the operating plate is engaged with the shielding plate, and
   wherein the biasing and holding means biases one of the shielding plate and the operating plate in a direction that causes a shift from the unshielding position to the shielding position.

6. An optical connector plug according to claim 1, wherein the shielding plate and the operating plate are held in the plug housing.

7. An optical connector plug according to claim 1,
   wherein the shielding plate and the operating plate are held by a shielding plate frame to constitute a shielding plate assembly, and
   wherein the shielding plate assembly is fixed to the plug housing.

8. An optical connector plug according to claim 1,
   wherein the shielding plate is held such that the shielding plate is rotatable about a shielding plate axis provided on the proximal end side of the shielding plate, and
   wherein the operating plate is held such that the operating plate is rotatable about an operating plate axis provided on the proximal end side of the operating plate.

9. An optical connector plug according to claim 1, wherein the shielding plate and the operating plate are made from leaf springs to function as the biasing and holding means themselves.

10. An optical connector plug according to claim 1, wherein the plug housing has a shape that enables the plug housing to engage with one of SC type and MU type optical connector adapters.

11. An optical connector plug according to claim 1, wherein placement of the shielding plate and the operating plate is such that the shielding plate and the operating plate do not come into contact with the front end face of the ferrule when moved from the unshielding position to the shielding position.

12. An optical connector plug according to claim 1,
   wherein the distal end of the operating plate has a contact concave portion, and
   wherein placement of the operating plate is such that the contact concave portion comes into contact with an outer wall of the ferrule when the plug frame is at the housing position and the operating plate is moved to the ferrule side.

13. An optical connector comprising the optical connector plug as set forth in claim 1.

* * * * *